(12) United States Patent
Kezys et al.

(10) Patent No.: US 7,187,332 B2
(45) Date of Patent: Mar. 6, 2007

(54) MOBILE WIRELESS COMMUNICATIONS DEVICE WITH HUMAN INTERFACE DIVERSITY ANTENNA AND RELATED METHODS

(75) Inventors: Vytas Kezys, Ancaster (CA); Yihong Qi, Waterloo (CA)

(73) Assignee: Research in Motion Limited, Ontario (CA)

( * ) Notice: Subject to any disclaimer, the term of this patent is extended or adjusted under 35 U.S.C. 154(b) by 97 days.

(21) Appl. No.: 11/067,935

(22) Filed: Feb. 28, 2005

(65) Prior Publication Data

US 2006/0192724 A1    Aug. 31, 2006

(51) Int. Cl.
*H01Q 1/24* (2006.01)

(52) U.S. Cl. ............... 343/702; 343/876; 343/700 MS

(58) Field of Classification Search ............... 343/702, 343/700 MS, 876; 455/90, 575
See application file for complete search history.

(56) References Cited

U.S. PATENT DOCUMENTS

| | | | |
|---|---|---|---|
| 4,584,709 A | 4/1986 | Kneisel et al. | 455/78 |
| 5,451,965 A | 9/1995 | Matsumoto | 343/702 |
| 5,557,293 A | 9/1996 | McCoy et al. | 343/867 |
| 5,905,467 A * | 5/1999 | Narayanaswamy et al. | 343/702 |
| 6,147,649 A | 11/2000 | Ivrissimtzis et al. | 343/700 |
| 6,271,796 B1 | 8/2001 | Itoh et al. | 343/702 |
| 6,295,030 B1 * | 9/2001 | Kozakai et al. | 343/700 MS |
| 6,307,511 B1 | 10/2001 | Ying et al. | 343/702 |
| 6,388,626 B1 | 5/2002 | Gamalielsson et al. | 343/702 |
| 6,452,556 B1 | 9/2002 | Ha et al. | 343/702 |
| 6,459,413 B1 | 10/2002 | Tseng et al. | 343/702 |
| 6,476,769 B1 | 11/2002 | Lehtola | 343/702 |
| 6,483,463 B2 * | 11/2002 | Kadambi et al. | 343/700 MS |
| 6,628,236 B2 | 9/2003 | Kim et al. | 343/702 |
| 6,664,930 B2 | 12/2003 | Wen et al. | 343/702 |
| 6,806,835 B2 | 10/2004 | Iwai et al. | 343/702 |
| 6,995,719 B2 * | 2/2006 | Ide | 343/702 |
| 2004/0053582 A1 | 3/2004 | Nakanishi et al. | 455/101 |
| 2004/0183729 A1 * | 9/2004 | Otaka et al. | 343/700 MS |
| 2004/0198473 A1 | 10/2004 | Tran | 455/575.1 |
| 2005/0184914 A1 * | 8/2005 | Ollikainen et al. | 343/702 |

FOREIGN PATENT DOCUMENTS

| EP | 0 752 735 | 1/1997 |
|---|---|---|
| WO | 02/078123 | 10/2002 |

* cited by examiner

*Primary Examiner*—Hoang V. Nguyen
(74) *Attorney, Agent, or Firm*—Allen, Dyer, Doppelt, Milbrath & Gilchrist, P.A.

(57) ABSTRACT

A mobile wireless communications device may include a portable handheld housing, and a wireless transceiver carried by the housing. A pair of an antennas are positioned in side-by-side relation preferably in the upper portion of the portable handheld housing. A human interface diversity controller is connected to the wireless transceiver to preferentially operate with the plurality of antennas based upon a relative position of the portable handheld housing with respect to a hand of a human user. The device can select or weight the antennas based upon the position of the device when being held by a user.

13 Claims, 4 Drawing Sheets

MOBILE WIRELESS COMMUNICATIONS DEVICE WITH HUMAN INTERFACE DIVERSITY ANTENNA AND RELATED METHODS

FIELD OF THE INVENTION

The present invention relates to the field of communications systems, and, more particularly, to wireless communications systems and related methods.

BACKGROUND OF THE INVENTION

One of the challenges of wireless communications is designing suitable antennas that can provide desired performance characteristics, yet are relatively small in size to fit within mobile devices. For example, with wireless devices such as mobile telephones, it is desirable to keep the overall size of the telephone as small as possible. Furthermore, internal antennas are generally preferred over external antennas, as externally mounted antennas take up more space and may be damaged while traveling, etc.

The use of an internal antenna in a handheld device, particularly those that can be held in various positions, such as by either, both or no hands, leads to the antenna environment being modified in different ways depending on how the user holds/positions the device. Accordingly, antenna designs have to be optimized for only a single position, e.g. one handheld scenario, or the antenna has to be designed to compromise between mulitple scenarios.

One example of an antenna that is implemented on a PCMCIA card to be inserted in a PCMCIA slot of a laptop computer is disclosed in U.S. Pat. No. 6,031,503 to Preiss, II et al. The antenna assembly includes two folded, U-shaped antennas, which may be dipoles or slot radiators, that are disposed orthogonally to one another to provide polarization diversity. Polarization diversity means that signals are transmitted and received on two different polarizations to increase the likelihood that the signal is received. Signals are carried to and from the antenna by microstrip feed lines. The microstrip lines are placed off center along each antenna slot to establish an acceptable impedance match for the antenna, and the feed lines are coupled to the communications card by coaxial cables.

Accordingly, with even more restrictive space constraints for such handheld devices, there is a need for antennas which are appropriately sized for such applications yet still provide desired performance characteristics.

SUMMARY OF THE INVENTION

In view of the foregoing background, it is therefore an object of the present invention to provide a mobile wireless communications device with an antenna and transceiver providing human interface diversity as well as other desired signal characteristics and related methods.

This and other objects, features, and advantages in accordance with the present invention are provided by a mobile wireless communication device including a portable handheld housing which may have an upper portion and a lower portion, and a wireless transceiver carried by the portable handheld housing. A plurality of antennas, preferably a pair of an antennas, are positioned in side-by-side relation preferably in the upper portion of the portable handheld housing. A human interface diversity controller is connected to the wireless transceiver to preferentially operate with the plurality of antennas based upon a relative position of the portable handheld housing with respect to a hand of a human user.

The human interface diversity controller preferentially weights transmit signals, and/or switches at least one antenna on and at least one antenna off, for example, based upon received signal strength. The plurality of antennas may be operable on a same frequency, have different polarizations, have different conductive patterns and/or have different frequencies for transmit and receive.

The portable handheld housing preferably has opposing parallel front and back surfaces and the plurality of antennas are arranged in side-by-side relation extending in a plane parallel to the front and back surfaces. A display, user input device and an input/output transducer are carried by the portable handheld housing and connected to the transceiver. Furthermore, the transceiver and the plurality of antennas are operable in a LAN wireless network and/or a cellular wireless network.

A method aspect of the invention is directed to operating a mobile wireless communications device to account for different human interface, the mobile wireless communications device having a portable handheld housing and a wireless transceiver therein, and a pair of antennas side-by-side in an upper portion of the portable handheld housing and connected to the wireless transceiver. The method includes controlling the wireless transceiver to preferentially operate with the pair of antennas based upon a relative position of the portable handheld housing with respect to a hand of a human user.

Controlling the wireless transceiver may include preferentially weighting transmit signals, and/or preferentially switching one antenna on and one antenna off for transmit signals. Again, the pair of antennas may be operated on a same frequency, and each antenna of the pair of antennas may have a different conductive pattern. Preferably, the portable handheld housing has opposing parallel front and back surfaces and the pair of antennas are arranged in side-by-side relation extending in a plane parallel to the front and back surfaces.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
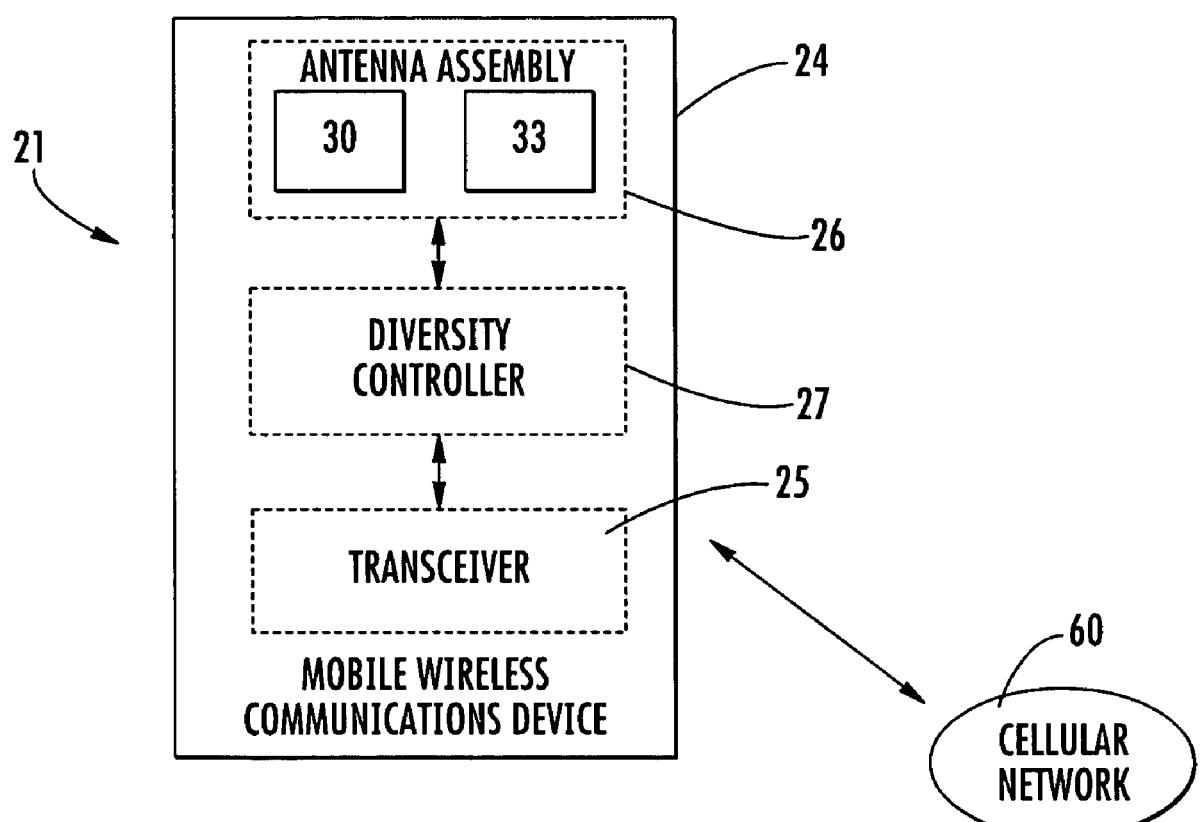
FIG. 1 is schematic diagram of a mobile wireless communications device in accordance with the present invention.

Referring initially to FIG. 1, a mobile wireless communications device 21 in accordance with the present invention is first described. The mobile wireless communications device 21 illustratively includes a portable, handheld housing 24, and a wireless transceiver 25 carried by the portable, handheld housing. The device 21 also illustratively includes an antenna assembly 26 for cooperating with the wireless transceiver 25 to communicate over the wireless network, as will be discussed further below. More particularly, the device 21 may be a PDA-type device in which the wireless transceiver and antenna assembly 26 cooperate to communicate various types of data, such as voice data, video data, text (e.g., email) data, Internet data, etc. over the wireless network. More specifically, the antenna assembly 26 may be used for placing telephone calls, in which case the device 21 may generally take the form or shape of a typical cellular telephone or a cellular-enabled PDA device, for example.

The antenna assembly 26 includes a plurality of antennas, preferably a pair of an antennas 30, 33 as illustrated. The pair of antennas 30, 33 are positioned in side-by-side relation preferably in the upper portion of the portable handheld housing 24. A human interface diversity controller 27 is connected to the wireless transceiver 25 to preferentially operate with the pair of antennas 30, 33 based upon a relative position of the portable handheld housing 24 with respect to a hand of a human user.

As discussed above, the use of an internal antenna in a handheld device, particularly those that can be held in various positions, such as by either, both or no hands, leads to the antenna environment being modified in different ways depending on how the user holds/positions the device. Accordingly, conventional antenna designs are optimized for only a single position, e.g. one handheld scenario, or the antenna is designed to compromise between mulitple scenarios.

Figure 2A:
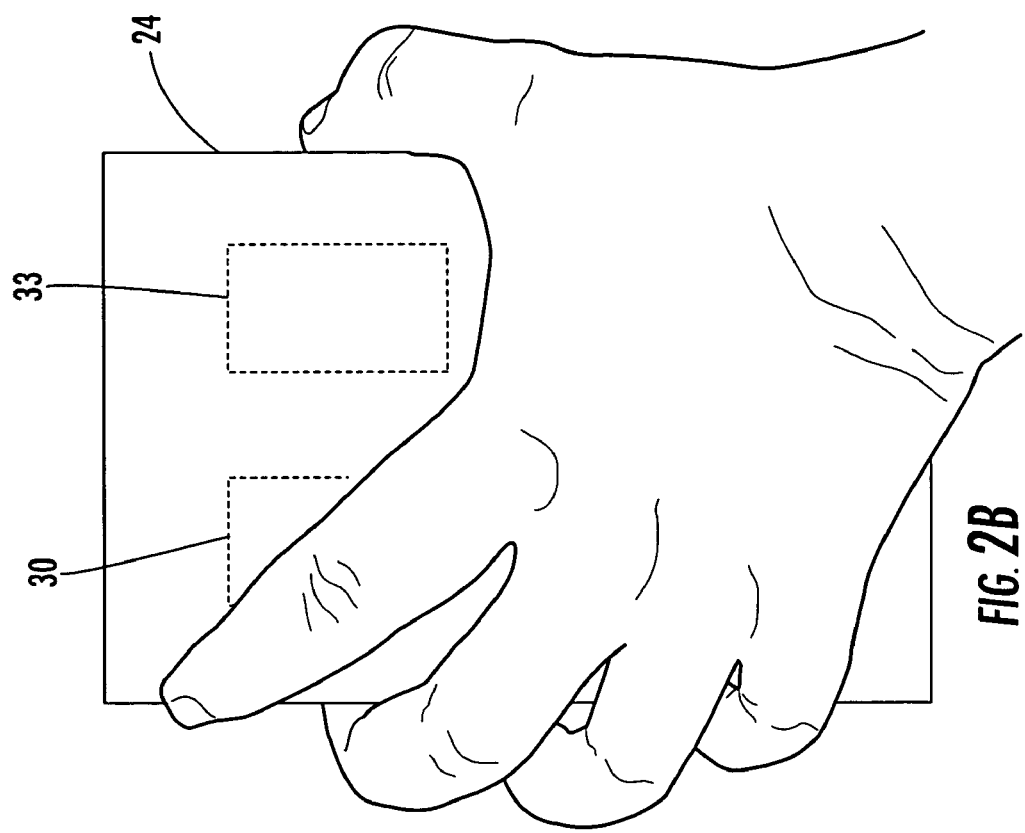
FIGS. 2A and 2B are schematic diagrams of the mobile wireless communications device of FIG. 1 illustrating the device being held by a user in respectively different positions.
Figure 2B:
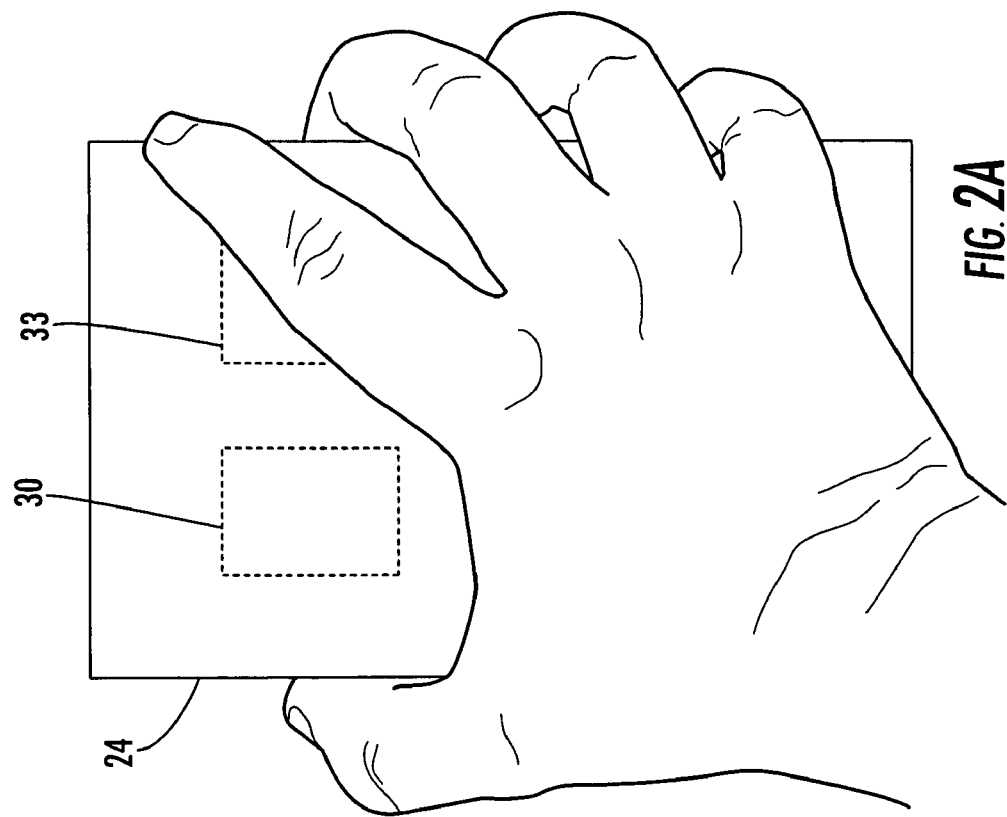

Turning additionally to FIGS. 2A and 2B, an embodiment of the pair of antennas 30, 33 and associated human interface diversity controller 27 will be described. Firstly, by using mulitple antennas in a human diversity arrangement, the mobile wireless communications device 21 can select the best antenna, or weighted combination, based upon how the user is holding the device. The antennas 30, 33 are designed to provide an overall high antenna system efficiency for the common user holding positions. The figures respectively illustrate a user holding the device 21 in a right hand and a left hand. As can be seen, the user's hand may be directly adjacent one of antennas 30, 33 thereby affecting the performance of the antennas. Accordingly, the associated human interface diversity controller 27 will preferentially operate the pair of antennas 30, 33 to provide the better or stronger signal tranmsission/reception.

The human interface diversity controller 27 preferentially weights transmit signals, and/or switches at least one antenna on and at least one antenna off, for example, based upon received signal strength. The plurality of antennas 30, 33 may be operable on a same frequency, have different polarizations, have different conductive patterns and/or have different frequencies for transmit and receive.

The portable handheld housing 24 preferably has opposing parallel front and back surfaces and the plurality of antennas 30, 33 are arranged in side-by-side relation extending in a plane parallel to the front and back surfaces. A display, user input device and an input/output transducer are carried by the portable handheld housing 24 and connected to the transceiver 25 as discussed below. Furthermore, the transceiver 25 and the plurality of antennas are operable in a cellular wireless network 60 and/or a LAN wireless network. The wireless LAN may operate in accordance with various wireless LAN standards, such as IEEE 802.11/802.11b or Bluetooth, for example, as will also be appreciated by those skilled in the art.

Figure 3:
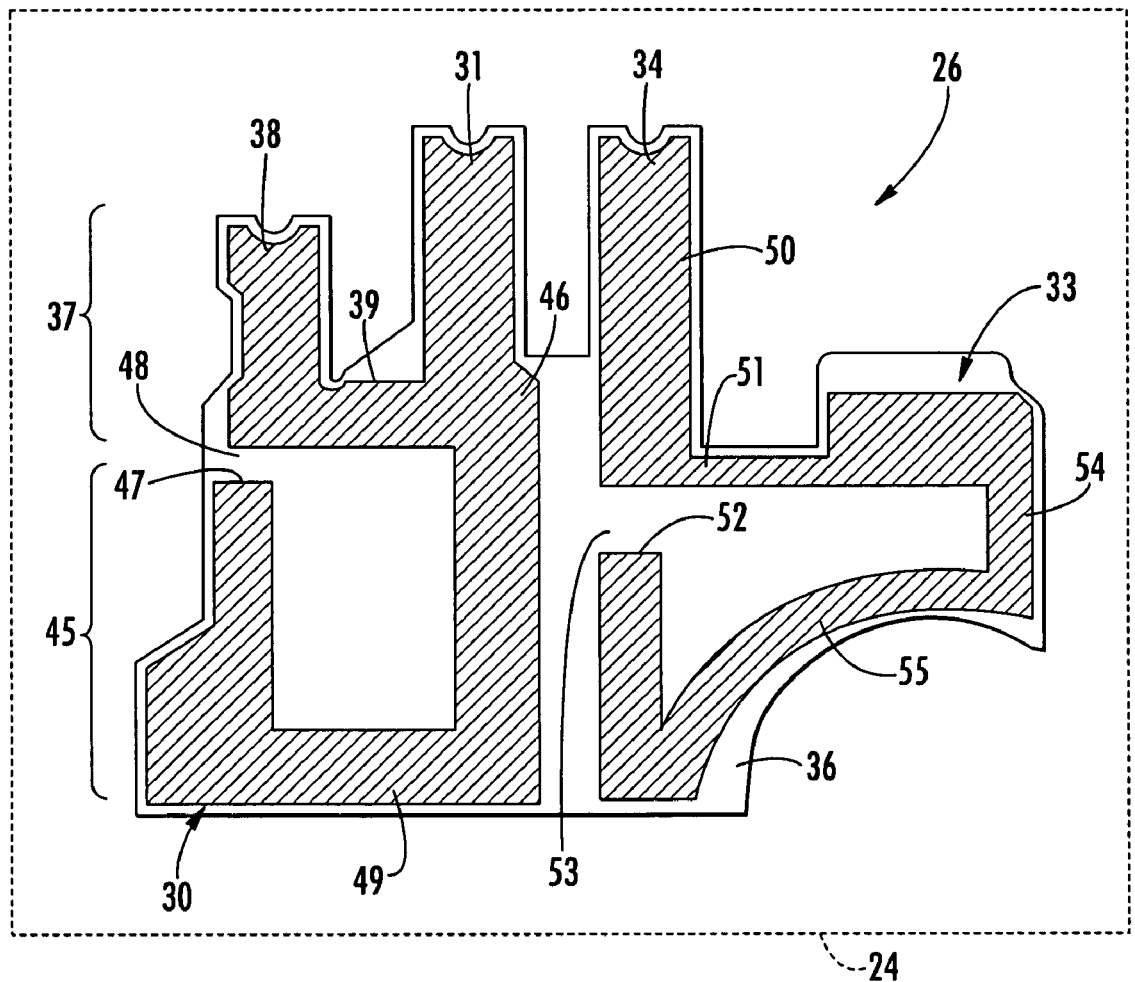
FIG. 3 is an enlarged rear elevational view of a portion of the mobile wireless communications device of FIG. 1 with the housing removed illustrating the pair of antennas thereof in greater detail.

Turning additionally to FIG. 3, further details of an embodiment of the antenna assembly 26 will be described and illustratively include the first antenna 30 coupled to the transceiver 25 at a feed point 31 and having a first shape. The antenna assembly 26 also illustratively includes the second antenna 33 coupled to the wireless transceiver 25 at a feed point 34. The second antenna 33 has a second shape different from the first shape of the first antenna 30.

The polarizations of the first and second antennas 30, 33 may be orthogonal to one another to provide maximum polarization diversity, as will be appreciated by those skilled in the art. Of course, other arrangements may be possible in other embodiments.

The first and second antennas 30, 33 may advantageously be implemented as planar, printed conductive elements on a circuit board 36. The circuit board may be mounted on the back side of the device 21 (i.e., the side pointing away from the user when holding the device to place a telephone call) at the top of the device (i.e., adjacent the end of the device with the ear speaker). The first and second antennas 30, 33 are shown with hatching to provide greater clarity of illustration.

The first antenna 30 illustratively includes a feed branch 37 including the first feed point 31, a second feed point 38 which is connected to ground, and a feed section 39 connected between the first and second feed points. The first antenna 30 further illustratively includes a loop branch 45 having a first end 46 coupled to the feed section 39 adjacent the first feed point 31. A second end 47 of the loop branch 45 is spaced apart from the feed section 39 by a gap 48, and the second end is adjacent the second feed point 38. A loop-back section 49 extends between the first and second ends 46, 47. More specifically, the loop-back section 49 generally loops in a clockwise direction from the first end 46 to the second end 47, as shown. The first antenna 30 thus generally defines a dual feed point, open loop configuration. This configuration advantageously provides increased space savings (i.e., reduced antenna footprint), as will be appreciated by those skilled in the art.

The second antenna 33 also illustratively includes a feed branch defined by the feed point 34 and a feed section 50. Further, a loop branch having a first end 51 coupled to the feed section 50, a second end 52 adjacent the feed branch and separated therefrom by a gap 53, and a loop-back 54 section extending between the first and second ends. The loop-back section 54 illustratively includes an arcuate portion 55. The second antenna 33 thus defines a single feed point, open loop element configuration. Again, this provides space savings, and, thus, reduced antenna footprint.

As will be appreciated by those skilled in the art, various design parameters (e.g., widths, lengths, loop shapes, notches, etc.) may be altered in the first and second antennas 30, 33 to provide different signal characteristics. By way of example, the overall dimensions of the first and second antennas 30, 33 may be 2 to 3 cm high by 2 to 3 cm wide for each element, although other dimensions may also be used. The antennas 30, 33 preferably operate over a wireless frequency range of about 2.4 to 2.5 GHz, for example, although other frequencies are also possible. Moreover, the coupling between the first and second antennas 30, 33 may also be adjusted to provide desired performance characteristics. By way of example, a preferred coupling distance or gap between the first and second antennas 30, 33 may be in a range of about 3 to 7 mm, although other gap distances may also be used as appropriate for different embodiments.

Because the first and second antennas 30, 33 have different shapes, they will also have different gain patterns, and thus advantageously provide pattern diversity, as will be appreciated by those skilled in the art. Moreover, the first and second antennas 30, 33 are preferably tuned to have substantially equal main lobe gain for enhanced performance. Of course, it will be appreciated that other antenna element shapes or types may be used in addition to those noted above. Electromagnetic shielding may be placed over one or both sides of the circuit board 36 as necessary in certain applications, as will also be appreciated by those skilled in the art.

A method aspect of the invention may include controlling the wireless transceiver 25 to preferentially operate with the pair of antennas 30, 33 based upon a relative position of the portable handheld housing 24 with respect to a hand of a human user. Again, controlling the wireless transceiver 25 may include preferentially weighting transmit signals, and/or preferentially switching one antenna on and one antenna off for transmit signals. Additional method aspects will be appreciated by those skilled in the art from the foregoing description.

Another example of a handheld mobile wireless communications device 1000 that may be used in accordance with the present invention is further described with reference to FIG. 4. The device 1000 includes a housing 1200, a keyboard 1400 and an output device 1600. The output device shown is a display 1600, which is preferably a full graphic LCD. Other types of output devices may alternatively be utilized. A processing device 1800 is contained within the housing 1200 and is coupled between the keyboard 1400 and the display 1600. The processing device 1800 controls the operation of the display 1600, as well as the overall operation of the mobile device 1000, in response to actuation of keys on the keyboard 1400 by the user.

The housing 1200 may be elongated vertically, or may take on other sizes and shapes (including clamshell housing structures). The keyboard may include a mode selection key, or other hardware or software for switching between text entry and telephony entry.

Figure 4:
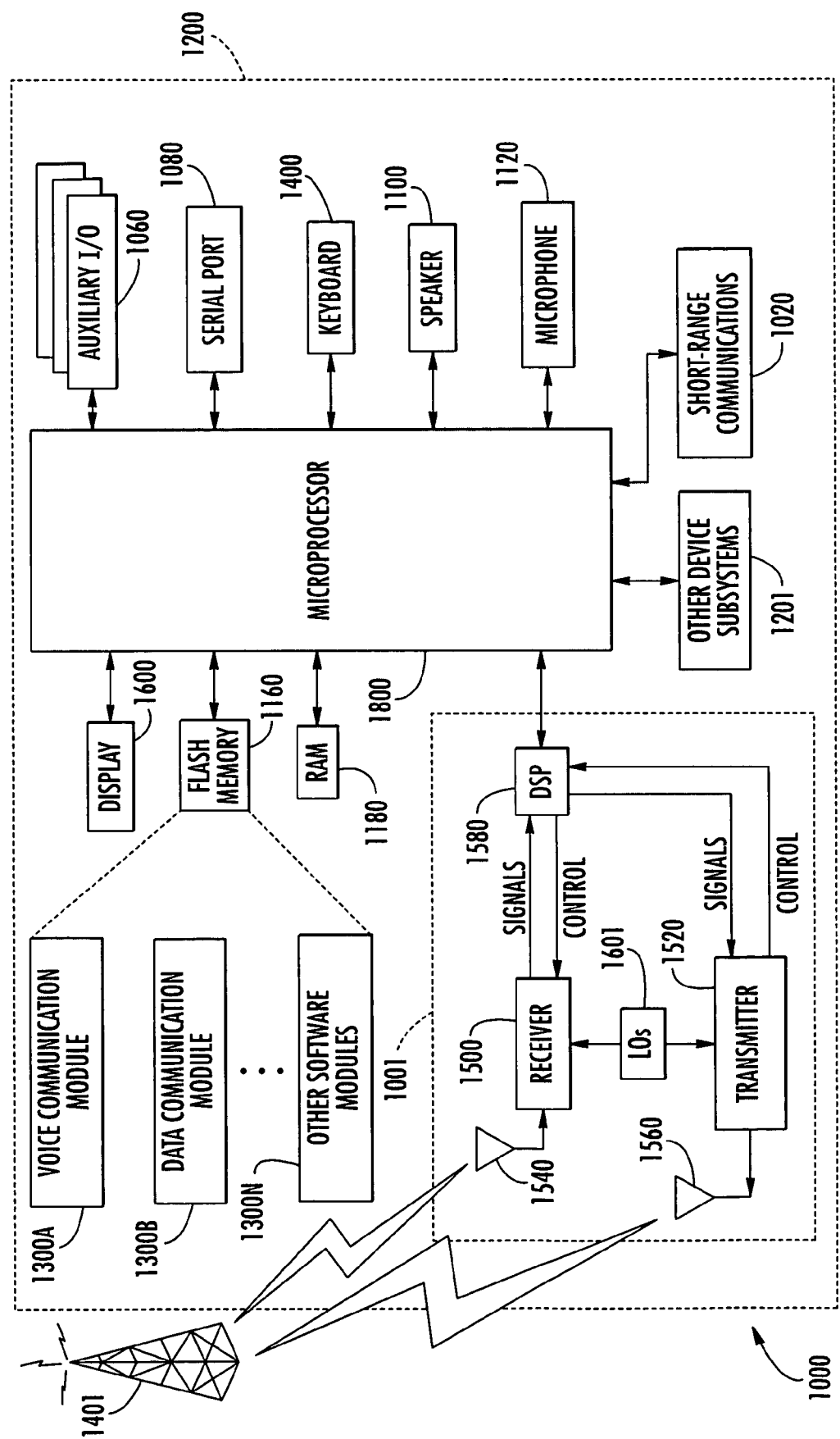
FIG. 4 is a schematic block diagram of an exemplary mobile wireless communications device for use with the present invention.

In addition to the processing device 1800, other parts of the mobile device 1000 are shown schematically in FIG. 4. These include a communications subsystem 1001; a short-range communications subsystem 1020; the keyboard 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. The antenna system can be designed so that when one antenna is covered by a hand, performance of one or more other antennas, including antenna gain and match, may not be degraded. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be utilized with the mobile device 1000.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keyboard 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth communications module to provide for communication with similarly-enabled systems and devices.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A mobile wireless communication device comprising:
   a portable handheld housing having opposing parallel front and back surfaces;
   a wireless transceiver carried by said portable handheld housing;
   a plurality of antennas positioned in side-by-side relation in said portable handheld housing, each of the antennas comprising a planar conductive element printed on a circuit board, and said plurality of antennas being arranged in side-by-side relation in an upper portion of the portable handheld housing and extending in a plane parallel to the front and back surfaces; and
   a human interface diversity controller connected to said wireless transceiver to preferentially operate with the plurality of antennas based upon a relative position of said portable handheld housing with respect to a hand of a human user, said human interface diversity controller preferentially weights transmit signals based upon received signal strength.

2. The mobile wireless communications device of claim 1 wherein the plurality of antennas are operable on a same frequency.

3. The mobile wireless communications device of claim 1 wherein the plurality of antennas have different polarizations.

4. The mobile wireless communications device of claim 1 wherein the plurality of antennas have different conductive patterns.

5. The mobile wireless communications device of claim 1 wherein the plurality of antennas have different frequencies for transmit and receive.

6. The mobile wireless communications device of claim 1 wherein the plurality of antennas comprises a pair of first and second antennas.

7. The mobile wireless communications device of claim 1 further comprising a display carried by said portable handheld housing and connected to said transceiver.

8. The mobile wireless communications device of claim 1 further comprising at least one user input device carried by said portable handheld housing and connected to said transceiver.

9. The mobile wireless communications device of claim 1 further comprising at least one input/output transducer carried by said portable handheld housing and connected to said transceiver.

10. The mobile wireless communications device of claim 1 wherein said transceiver and said plurality of antennas are operable in at least one of a LAN wireless network and a cellular wireless network.

11. A method of operating a mobile wireless communications device to account for different human interface, the mobile wireless communications device having a portable handheld housing and a wireless transceiver therein, and a pair of antennas side-by-side in an upper portion of the portable handheld housing and connected to the wireless transceiver, each of the antennas comprising a planar conductive element printed on a circuit board, and the portable handheld housing having opposing parallel front and back surfaces and the pair of antennas are arranged in side-by-side relation extending in a plane parallel to the front and back surfaces, the method comprising controlling the wireless transceiver to preferentially operate the pair of antennas based upon a relative position of the portable handheld housing with respect to a hand of a human user, including preferentially weighting transmit signals based upon received signal strength.

12. The method of claim 11 wherein the pair of antennas are operated cn a same frequency.

13. The method of claim 11 wherein each antenna of the pair of antennas has a different conductive pattern.

\* \* \* \* \*

UNITED STATES PATENT AND TRADEMARK OFFICE
CERTIFICATE OF CORRECTION

PATENT NO.        : 7,187,332 B2                                      Page 1 of 1
APPLICATION NO.   : 11/067935
DATED             : March 6, 2007
INVENTOR(S)       : Kezys et al.

It is certified that error appears in the above-identified patent and that said Letters Patent is hereby corrected as shown below:

Column 8, Line 55    Delete: " cn "

Insert: -- on --

Signed and Sealed this

Seventh Day of August, 2007

JON W. DUDAS
*Director of the United States Patent and Trademark Office*